United States Patent Office 3,280,015
Patented Oct. 18, 1966

3,280,015
MANUFACTURING PROCESS FOR HYDRAZINE
AND HYDRAZINE DERIVATIVES
Ju Chin Chu, 34 Linden St., Garden City, N.Y.
No Drawing. Filed Feb. 28, 1962, Ser. No. 176,453
16 Claims. (Cl. 204—101)

The existing processes for the manufacture of hydrazine produce a stream containing a relatively small percentage in hydrazine. The recovery and concentration of hydrazine from such stream requires considerable amount of power and utility. This is the main reason why hydrazine still commands a rather high price today.

The present invention involves the use of fuel cells for the production of hydrazine. The fuel cell serves a dual function of producing hydrazine solution and furnishing power for the concentration of hydrazine in the later stages after the fuel cell reaction.

In the fuel cell there are two electrodes: anodes and cathodes. Between the two electrodes an aqueous solution of potassium or sodium hydroxide is used as electrolyte for the cell. Although any alkaline and carbonate solution can be used as electrolyte, potassium hydroxide solution at 28% concentration appears to be the best from the standpoint of high electrical conductivity. Hydrazine is very easily decomposed in the presence of various metals which act as the catalyst for the decomposition. Precaution should be observed not to let hydrazine to be in contact with any metallic surface. Graphite cell and carbon electrodes are used in the fuel cell for this purpose. Additional precaution can be provided by adding a small amount of inhibitor, such as glue or gelatin, to inactivate the metallic impurities in the solution.

The raw materials fed into the fuel cell are ammonia and chlorine or fluorine gas. For economical reasons, chlorine is preferred. Ammonia is fed continuously to the anode compartment diffusing through the porous carbon electrode which is immersed in the solution of electrolyte, potassium or sodium hydroxide. Chlorine is fed continuously into the cathode compartment where chlorine gas is made to diffuse through the porous carbon electrode into the aqueous solution of potassium or sodium hydroxide which acts as an electrolyte between two electrodes.

The overall half cell reaction which takes place at the anode is represented by the following equation:

$$6NH_3 + 2ClO^- + 2OH^- \rightarrow 3N_2H_4 + 4H_2O + 2Cl^- + 2e \quad (1)$$

Ammonia reacts with hypochlorite ion and hydroxyl ion to produce hydrazine, water and chloride ion. In addition, electrons are produced on the electrode which will be transferred through the external circuit to the cathode to carry out the following reaction:

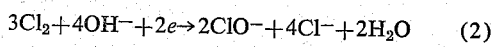
$$3Cl_2 + 4OH^- + 2e \rightarrow 2ClO^- + 4Cl^- + 2H_2O \quad (2)$$

Chlorine gas interacts with hydroxyl ion and electron to produce hypochlorite ion and chloride ion. The hypochlorite ion thus produced migrates through the electrolyte to the anode, where the anode reaction, as previously described, takes place.

For the anode reaction as represented by (1), the value of $E^0$ at 25° C. is equal to at least $+1.48$ volts. For the cathode reaction (2), the value of $E^0$ at 25° C. is equal to 2.297. For the complete fuel cell reaction, the open circuit standard voltage should be at least 3.78 volts. It is estimated that about 0.5 volt would be the overvoltage for both electrodes. The optimum operating voltage of such fuel cell should be at least 1.64 volts, which is relatively high compared to the most existing fuel cells. A large number of fuel cells are connected in series to provide enough voltage for actual power usage in the hydrazone plant.

A separator is placed above the electrolyte between the two electrodes so that chlorine gas will be only present in the cathode compartment, and ammonia gas will be only in the anode compartment. Ammonia and chlorine will be under no circumstances mixed by this kind of set-up.

Hydrazine produced in the cell will be continuously pumped along with the electrolyte to the concentration unit, for the recovery and the concentration of hydrazine. The temperature of the electrolyte in the fuel cell is maintained at a level between 18° C. and 200° C., and the cell is pressurized so that both hydrazine and water will be in the liquid form. However, the temperature required to be maintained in the fuel cell is much lower than that used in the other processes to make the equivalent amount of production in hydrazine.

Since each fuel cell can only produce a small voltage, it is necessary to connect these fuel cells in series to accumulate a voltage of practical order of magnitude for the power utilization. The surface area of the electrode, and the space between the electrodes in each cell, is determined by the producing capacity for hydrazine. This is done by the usual procedure of plant design, and is in no way to affect the basic requirement of this invention.

Besides chlorine, the other oxidizer, such as fluorine, ozone, oxygen, and nitrogen dioxide, can be used. In the case of nitrogen dioxide and ozone, the temperature of the solution must be carefully controlled to avoid the possible explosive reaction between the oxidants and hydrazine at the elevated temperature.

To enable the fuel cell for the continuous and simultaneous production of hydrazine and power, the drowning or overflooding of the electrodes by the electrolyte should be avoided. There are quite a number of methods suggested for this purpose. The best method is to use the electrode of right porosity and to cover the surface of electrode by a thin film which can allow the flow of gas but not the liquid. Wax film can be a good one to use.

This invention can also be used for the manufacture of hydrazine derivatives, if ammonia is replaced by different kinds of amines or a mixture of ammonia and amines. For example, if methyl amine instead of ammonia is used as the feeding gas at the anode, symmetrical dimethyl hydrazine will be formed. To make unsymmetrical dimethyl hydrazine, a mixture of ammonia and dimethyl amine would be required as the fuel gas to the anode of the fuel cell.

The following examples give further illustration of this invention.

Example 1.—A single fuel cell was made to consist of a cathode compartment and an anode compartment. The compartments are connected by the aqueous solution of 20% potassium hydroxide. Both electrodes, which are cylindrical in form, are made of graphite, the porosity of which is such that the gases, chlorine and ammonia, can diffuse through the electrode at reasonable rate, but the liquid electrolyte cannot wet or diffuse through the electrode. With a heating coil, the temperature of the liquid bath is maintained at 100° C., under a total pressure of 2 atmospheres. Ammonia gas at the rate of 1.8 lb.-moles per hour was sent into the anode, and chlorine gas at the rate of 1 lb.-moles per hour was sent into the cathode. 750 lbs. of 20% KOH per hour were pumped through the cell compartment between two electrodes. The open circuit voltage measured was 3.7 volts. The operating voltage per cell was found to be 1.6 volts.

The solution from the fuel cell, which contains hydrazine, is pumped to the distillation tower in two successive stages to recover hydrazine in the form of an aqueous solution containing 90% hydrazine hydrate. Yields of 65%, based on the amount of chlorine fed into the fuel cell, was obtained.

*Example 2.*—Same as Example 1, wherein a 20% sodium hydroxide solution was used. A total pressure of 4 atmospheres, and a temperature of 140° C., were maintained in the fuel cell. An open circuit voltage of 3.92 volts was obtained for each cell. After flashing and distillation, the yield of hydrazine was 75%, based on the amount of chlorine fed into the fuel cell.

*Example 3.*—Same as Example 1, wherein methyl amine was used as the feed to the anode to replace ammonia. An open circuit voltage of 3.72 volts was obtained for each cell. The voltage of the operating cell was 1.61 volts. After flashing and distillation in two successive stages, the yield of symmetrical dimethyl hydrazine was found to be 70%, based on the amount of chlorine fed into the fuel cell.

*Example 4.*—Same as Example 3, wherein a 10%, instead of 20%, potassium hydroxide solution was used. A total pressure of 4 atmospheres, and a temperature of 150°, were maintained in the fuel cell. An open circuit voltage of 4.18 volts was recorded for each cell. The voltage of the operating cell was 1.80 volts. After flashing and distillation in two succesive stages, the yield of symmetrical dimethyl hydrazine was found to be 80%, based on the amount of chlorine fed into the cathode compartment of the fuel cell.

*Example 5.*—Same as Example 1, wherein an equal molal mixture of ammonia and dimethyl amine was used as the feed to the anode to replace ammonia. An open circuit voltage of 3.71 volts was obtained for each cell. The voltage of the operating cell was 1.59 volts. After flashing and distillation in two successive stages, the yield of unsymmetrical dimethyl hydrazine was found to be 60%, based on the amount of chlorine fed into the fuel cell.

*Example 6.*—Same as Example 5, wherein a 10% sodium hydroxide solution instead of 20% potassium hydroxide solution was used as the electrolyte. A total pressure of 4 atmospheres, and a temperature of 150° C., were maintained in the fuel cell. An open circuit voltage of 4.20 volts was obtained for each fuel cell. The voltage of the operating cell was 1.70 volts. After flashing and distillation, the yield of unsymmetrical dimethyl hydrazine was found to be 70%, based on the amount of chlorine fed into the cathode compartment of the fuel cell.

*Example 7.*—The fuel cell as described in Example 1 was connected in series in a bank of 70 units, using the same rate of feeding ammonia, chlorine gas and 20% potassium hydroxide solution into each cell. The operating voltage from this series of fuel cells was found to be 110 volts.

The solution from each fuel cell was mixed in one tank. Afterwards, flashing and two stage distillation were carried out to yield an aqueous solution containing 90% hydrazine hydrate. The yield of hydrazine was 65%, based on the amount of chlorine fed into the fuel cell.

*Example 8.*—The fuel cell as described in Example 2 was connected in series in a bank of 57 units, using the same rate of feeding ammonia, chlorine and 20% sodium hydroxide solution. The operating voltage from this series of fuel cells was about 110 volts.

The solution from each fuel cell was mixed in one tank. Afterwards, flashing and two stages distillation were carried out to yield an aqueous solution containing 90% hydrazine hydrate. The yield of hydrazine was 75%, based on the amount of chlorine fed into the fuel cell.

*Example 9.*—The fuel cell as described in Example 3 was connected in series in a bank of 69 units, using the same rate of feeding methyl amine, chlorine and electrolyte. The operating voltage from the bank of fuel cells was found to be 110 volts.

The solutions from each fuel cell were sent into a mixing tank. Afterwards, flashing and two stage distillation were carried out to yield an aqueous solution containing 85% hydrazine hydrate. The yield of dimethyl hydrazine was 70%, based on the amount of chlorine fed into the fuel cell.

*Example 10.*—The fuel cell as described in Example 4 was connected in series in a bank of 62 units, using the same rate of feeding of methyl amine, chlorine and electrolyte. The operating voltage from this series of fuel cells was found to be 110 volts.

The solutions from each fuel cell were sent into a mixing tank. Afterwards, flashing and two stage distillation were carried out to yield an aqueous solution containing 90% dimethyl hydrazine hydrate. The yield of symmetrical dimethyl hydrazine was 80%, based on the amount of chlorine fed into the fuel cell.

*Example 11.*—The fuel cell as described in Example 5 was connected in series in a bank of 70 units, using the same rate of feeding of ammonia, dimethyl amine, chlorine and electrolyte. The operating voltage from this series of fuel cells was found to be 110 volts.

The solutions from each fuel cell were sent into a mixing tank. Afterwards, flashing and two stage distillation were carried out to yield an aqueous solution containing 85% unsymmetrical dimethyl hydrazine hydrate. The yield of unsymmetrical dimethyl hydrazine was 60%, based on the amount of chlorine fed into the fuel cell.

*Example 12.*—The fuel cell as described in Example 6 was connected in series in a bank of 65 units, using the same rate of feeding of ammonia, dimethyl amine, chlorine and electrolyte. The operating voltage from this series of fuel cells was found to be 110 volts.

The solutions from each fuel cell were sent into a mixing tank. Afterwards, flashing and two stage distillation were employed to yield an aqueous solution containing 90% unsymmetrical dimethyl hydrazine hydrate. The yield of unsymmetrical dimethyl hydrazine was 70%, based on the amount of chlorine fed into the fuel cell.

What I claim is:

1. The method of making a product selected from the group consisting of hydrazine and substituted hydrazine in a fuel cell productive of electrical energy, comprising
   (1) introducing into a reaction zone a fluid electrolyte comprising an aqueous solution of an alkali metal compound selected from the group consisting of hydroxides, carbonates and mixtures thereof,
   (2) providing anode and cathode regions within said reaction zone,
   (3) providing an electrical circuit external to said reaction zone connectable between said anode and cathode regions,
   (4) introducing into said anode region a first reactant comprising a fluid selected from the group consisting of ammonia, volatile alkyl and aryl primary and secondary amines selected from the group consisting of $RNH_2$, $R_2NH$, $RR^1NH$ and mixtures thereof, wherein R is the alkyl radical and $R^1$ is the aryl radical,
   (5) introducing into said cathode region a second reactant comprising an oxidizing agent, whereby said reactants combine to form said product which is dissolved in said electrolyte, and whereby electrical energy flows through the connected external circuit,
   (6) withdrawing the product-containing electrolyte from the reaction zone, and
   (7) separating said product from said electrolyte.

2. A method in accordance with claim 1, wherein the second reactant is selected from the group consisting of chlorine, fluorine, and mixtures thereof, ozone, oxygen and nitrogen dioxide.

3. A method in accordance with claim 1, wherein the electrolyte comprises potassium hydroxide, and the first reactant is ammonia.

4. A method in accordance with claim 1, wherein the electrolyte comprises potassium hydroxide, and the first reactant is methyl amine, the second reactant is chlorine, and the product is symmetrical dimethylhydrazine.

5. A method in accordance with claim 1, wherein the electrolyte comprises sodium hydroxide and the first reactant is ammonia.

6. A method in accordance with claim 1, wherein the the first reactant is an equimolar mixture of ammonia and dimethyl amine, the second reactant is chlorine, and the product is unsymmetrical dimethylhydrazine.

7. A method in accordance with claim 1, wherein the reaction zone is maintained at an operating temperature above the freezing point of the electrolyte and below the decomposition temperature of the product and at a pressure above the vapor pressure of the liquid electrolyte at the operating temperature, and wherein the product-containing electrolyte is continuously withdrawn from the reaction zone and fresh, substantially product-free electrolyte is continuously introduced into the reaction zone.

8. A method in accordance with claim 1, wherein the reaction zone is maintained free of contact with metal which can catalytically decompose hydrazine and its derivatives, and reaction between the said metallic impurities in the electrolyte and the product is prevented by adding an inhibitor to the electrolyte.

9. A method in accordance with claim 1, wherein the molal ratio of the first reactant to the second reactant is maintained less than 2.0, whereby the oxidizing agent is present in excess of its stoichiometric requirement for reaction.

10. A method in accordance with claim 3, wherein the second reactant is chlorine.

11. A method in accordance with claim 10, wherein the electrolyte comprises an aqueous solution containing from about 1 to about 30 weight percent potassium hydroxide, and said reaction zone is maintained at super-atmospheric pressure and at a temperature between about 18 to about 250° C.

12. A method in accordance with claim 5, wherein the second reactant is chlorine and the product is hydrazine.

13. A method in accordance with claim 12, wherein the electrolyte comprises an aqeuous solution containing from about 1 to about 30 weight percent sodium hydroxide and said reaction zone is maintained at superatmospheric pressure and at a temperature between about 18 and about 250° C.

14. A method of chemically generating electrical power and of simultaneously producing a useful by-product composition comprising providing a plurality of reaction zones each having an anode and a cathode region, providing an electrical circuit externally of said reaction zones whereby said anode and cathode regions are serially connected so that the output voltages thereof are in additive arrangement, continuously introducing into each of said reaction zones a liquid electrolyte comprising an aqueous solution of an alkali metal compound selected from the group consisting of hydroxides, carbonates and mixtures thereof, continuously introducing into each of said anode regions a first reactant selected from the group consisting of ammonia, volatile and liquid alkyl and aryl amines and mixtures thereof, continuously introducing an oxidizing agent into each of said cathode regions whereby said reactants combine to produce a by-product selected from the group consisting of hydrazine and substituted alkyl and aryl derivatives thereof, with the concomitant production of an electrical voltage across said external circuit, continuously withdrawing by-product-containing electrolyte from each of said reaction zones and feeding the same into a common mixing tank, and feeding the liquid from the mixing tank to a by-product recovery zone wherein the by-product is separated by flashing and fractional distillation from the electrolyte.

15. A method of concomitantly generating electrical energy and producing a useful chemical product comprising:
(1) providing an enclosed reaction zone,
(2) partially filling said reaction zone with an electrolyte comprising an aqueous solution of an alkali metal compound selected from the group consisting of hydroxides, carbonates and mixtures thereof,
(3) separating the space within said reaction zone above the surface of the electrolyte into first and second gas-tight compartments,
(4) inserting within the first compartment and into the electrolyte an anode provided with a thin surface film pervious to a first reactant and impervious to said electrolyte,
(5) inserting within the second compartment and into the electrolyte a cathode provided with a thin surface film pervious to a second reactant and impervious to said electrolyte,
(6) providing an electrical circuit externally of said reaction zone and connectable between said anode and said cathode,
(7) diffusing through said anode and into said electrolyte a first reactant comprising a material selected from the group consisting of ammonia, fluid alkyl and aryl amines and mixtures thereof, and
(8) diffusing through said cathode and into said electrolyte a second reactant comprising an oxidizing agent, whereby said reactants combine with the generation of an electrical voltage across said circuit and with the production of a product selected from the group consisting of hydrazine and alkyl and aryl substituted derivatives thereof.

16. A method in accordance with claim 15, wherein the electrodes are constructed of graphite and wherein the electrolyte is prevented from entering the electrodes by deposition thereover of a wax film.

References Cited by the Examiner
UNITED STATES PATENTS

| | | | |
|---|---|---|---|
| 1,588,608 | 6/1926 | Oppenheim | 136—86.5 |
| 2,384,463 | 9/1945 | Gunn et al. | 136—86 |
| 2,583,585 | 1/1952 | Marshall | 23—190 |

FOREIGN PATENTS 584,845 10/1959 Canada.

OTHER REFERENCES

Status Report on Fuel Cells, June 1959, ARO Report No. 1, PB 151804 (pp. 88, 89).

Heise: Transactions of the Electrochemical Society, vol. LXXV, 1939, 147–157.

WINSTON A. DOUGLAS, *Primary Examiner.*

MURRAY TILLMAN, JOHN H. MACK, *Examiners.*

G. KAPLAN, H. FEELEY, *Assistant Examiners.*